United States Patent [19]

Rasmussen

[11] Patent Number: 4,580,526
[45] Date of Patent: Apr. 8, 1986

[54] CORNER TANK

[76] Inventor: Bruce A. Rasmussen, R.D. #2 Peaceable St., Ballston Spa, N.Y. 12020

[21] Appl. No.: 656,610

[22] Filed: Oct. 1, 1984

[51] Int. Cl.⁴ ............................................. A01K 64/00
[52] U.S. Cl. ...................................................... 119/5
[58] Field of Search ............................................ 119/5

[56] References Cited

U.S. PATENT DOCUMENTS

| | | | |
|---|---|---|---|
| 2,293,612 | 8/1942 | Montague | 119/5 |
| 2,879,742 | 3/1959 | Morrill | 119/5 |
| 3,664,301 | 5/1972 | Morrill | 119/5 |
| 3,696,789 | 10/1972 | Richard | 119/5 |
| 3,854,450 | 12/1974 | Puckett | 119/5 |
| 4,126,102 | 11/1978 | Galloway | 119/5 |
| 4,147,131 | 4/1979 | Walker | 119/5 |

*Primary Examiner*—Hugh R. Chamblee
*Attorney, Agent, or Firm*—Heslin, Watts & Rothenberg

[57] ABSTRACT

A corner tank especially configured to fit the contour of a corner of a room produces the optical appearance of a tank of rectangularly solid shape while occupying only one-quarter of the volume. The tank has a horizontal cross sectional profile in the shape of a right isoceles triangle and includes a front vertical member of transparent material and two side vertical members having reflective surfaces facing the interior of the tank. With the side members located adjacent and parallel to the abutting walls of the corner of a room, the tank appears, to an observer looking through the front member, to possess substantially greater volume with the increased volume appearing to extend into the walls of the corner. Tank supporting structures and hoods of congruous configuration and operation can be employed with the corner tank.

25 Claims, 11 Drawing Figures

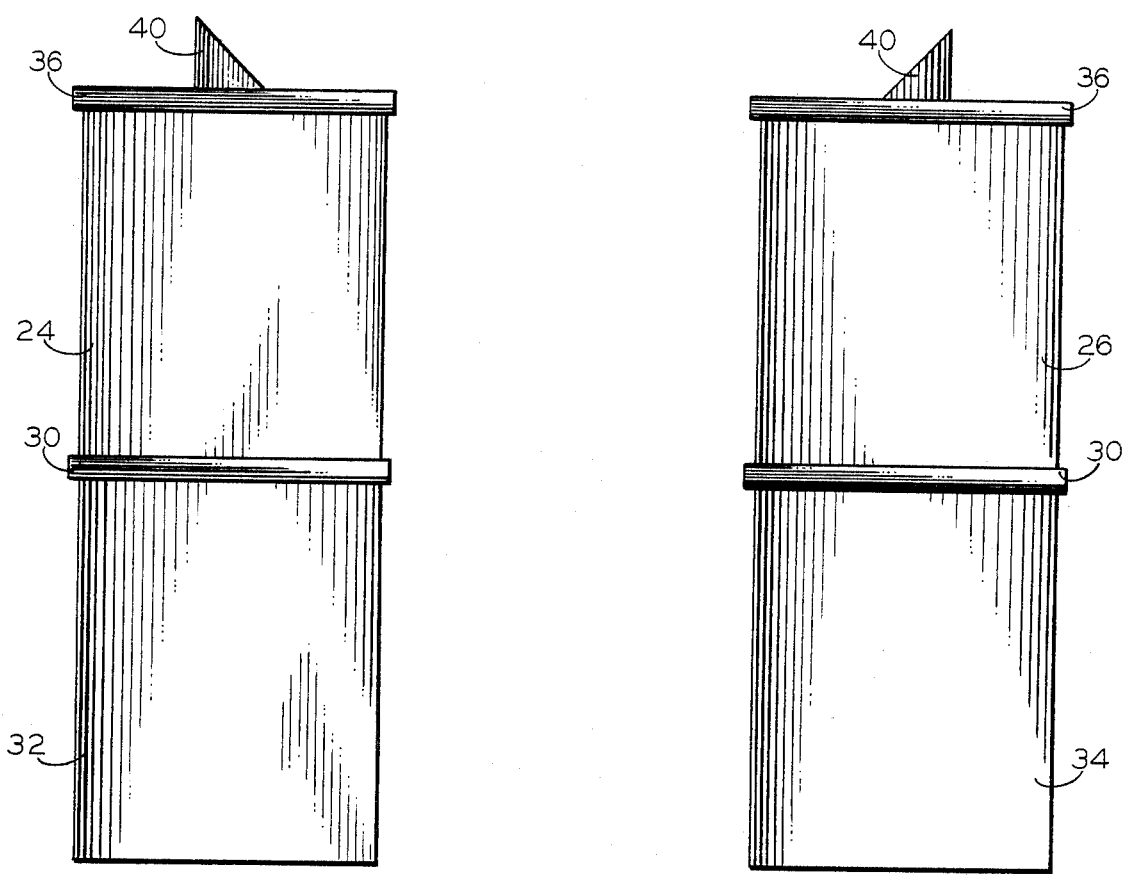
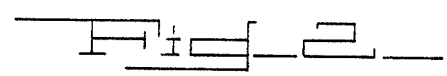
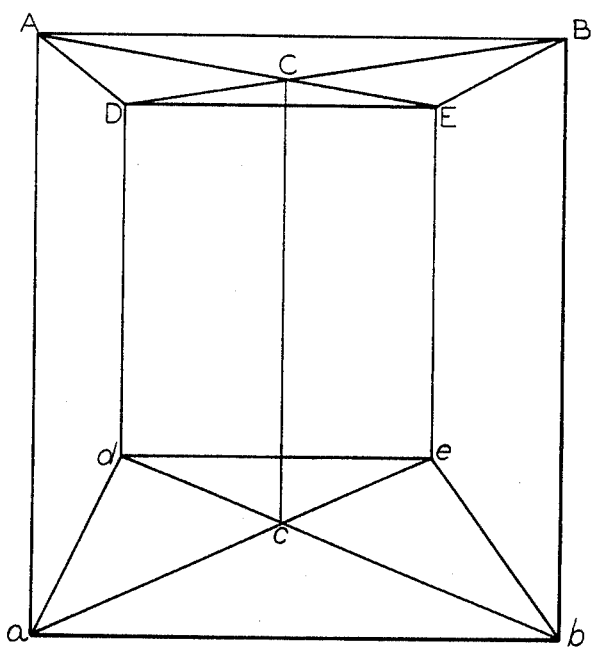
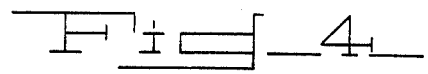

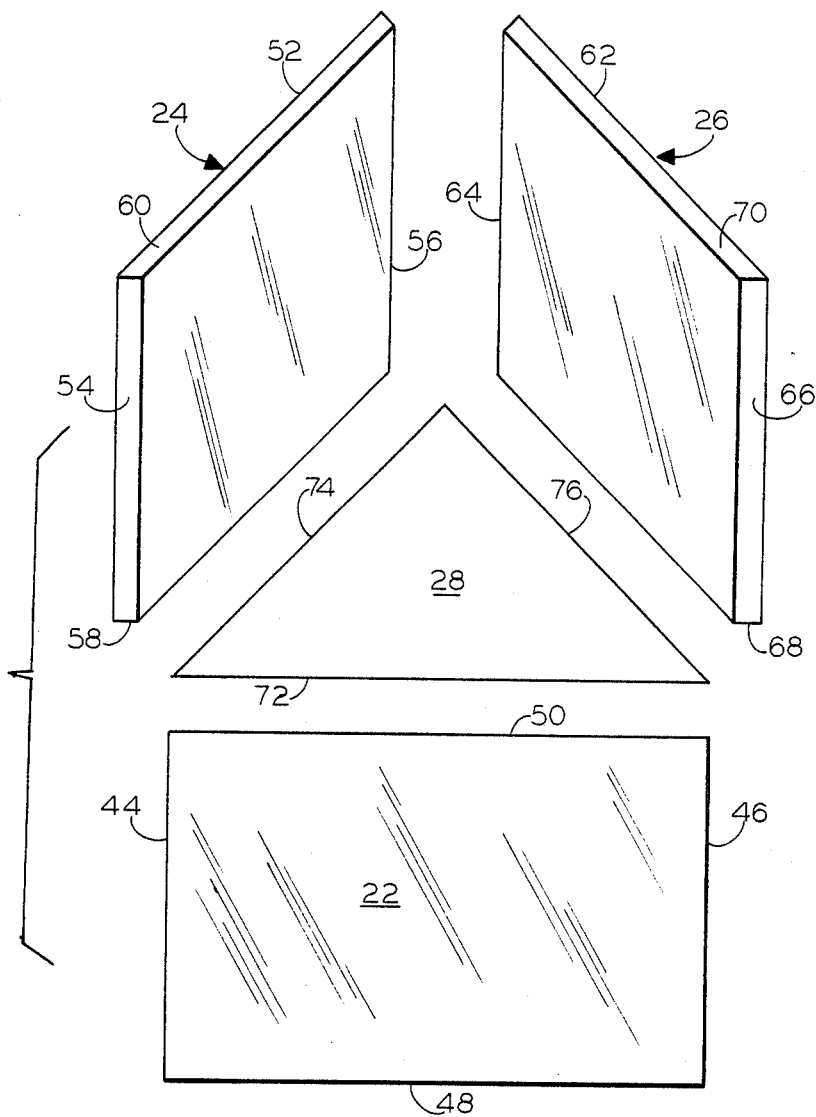
FIG_5_
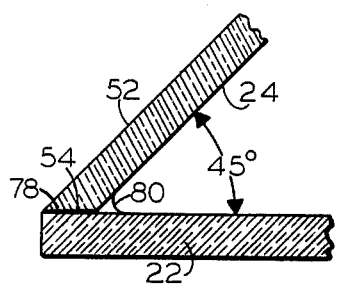
FIG_6_
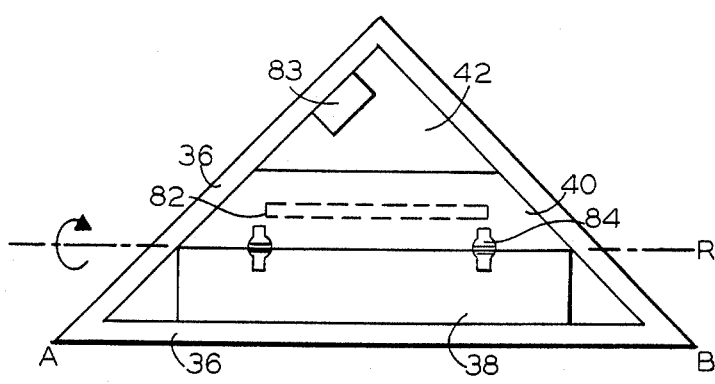
FIG_7_

CORNER TANK

BACKGROUND OF THE INVENTION

1. Technical Field

The present invention relates in general to tanks used as aquariums, terrariums and the like and more particularly to such tanks especially designed to fit in a corner of a room and produce an optical illusion of increased volume.

2. Background Information

Aquariums for displaying fish are today commonly found in homes, schools and other locations. The traditional aquarium consists of four panes of clear glass set at 90° angles with a suitable rectangularly-shaped member employed to close the bottom of the tank. A rectangularly-shaped hood is generally used with such tanks. The hood provides a vapor barrier and may also support tank illumination means, a lid for providing access to the interior of the tank and a utility area for connecting heaters, filters, etc. within the tank.

Although the traditional rectangularly-shaped aquarium provides an intriguing miniature replica of underwater environment, it is not well suited for use in the corner of a room from either an aesthetic or efficient utilization of space viewpoint. Furthermore, if so located, it would require viewing through a distortion introducing corner of the tank from some perspectives in the room.

Tanks of other configuration have been suggested in the past. For example, U.S. Pat. Nos. 3,696,789, 4,126,102 and 4,147,131 describe aquariums of triangular cross section. In each instance, the front and side members of the tank are transparent, and it would appear that this condition is necessary to accomplish the objective of each of the patented tanks. None of these earlier aquariums is specifically directed to the problem of efficiently utilizing room corner space and if so located, would inherently appear as a tank of limited volume, especially when compared to the traditional rectangular tank.

U.S. Pat. No. 2,879,742 depicts an aquarium of semi-cylindrical shape having a rear reflective wall. This patent is directed to an "Aquarium With Habitat Effect" and which "produces an appearance that the tank contained body of water extends without limit into the distance away from the eyes of the observer such as the appearance which characterizes a natural underwater scene when viewed from under the surface of the water." (Column 2, lines 6–10). This effect is apparently at least partially produced by a "deepening obscurity of the tank contents at receding distances from the transparent front wall." (Column 4, lines 31–32, also see FIG. 6 and the description thereof). The patent indicates that the rear reflecting wall although preferably cylindrical in shape can have other surface curvatures or be approximated by a multiplicity of flat mirror surfaces. (See Column 4, lines 14–22). However, this patent, like those discussed above, is not concerned with the efficient utilization of corner space and, moreover, as stated in a later improvement patent by the same patentee "unduly distorts the reflected images of objects present in the tank. The distortion is particularly evident with respect to moving objects such as fish, to the point of discomfurture to the eyes of the viewer." (U.S. Pat. No. 3,644,301 Column 1, lines 19–24). The patentee overcomes these problems by reducing the distance between the center of his rear curved reflector and his front transparent panel.

A need thus persists for a tank adapted for use in a corner of a room which provides the appearance of volume equivalent to that of the traditional aquarium without significantly distorting the images of the contents of the tank.

SUMMARY OF THE INVENTION

Briefly stated, the invention satisfies this need by providing a tank especially designed to fit in a corner of a room and produce a volume multiplying optical effect. The tank preferably has a horizontal cross sectional profile in the shape of a right isoceles triangle. The vertical front member of the tank is transparent while the two vertical side members have a reflective surface facing the interior of the tank. When placed in a corner of a room with the side members parallel to the abutting walls of the corner, the tank provides an appearance, to an observer looking through the front member, of a rectangular solid of volume four times that actually possessed by the tank, as well as substantially distortion-free multiple images of items contained within the tank. Furthermore, the contents of the tank is visible from anywhere in the room without having to look through a corner of the tank, thereby eliminating that source of distortion. The invention also contemplates specially designed hoods and supporting structures to compliment the configuration and function of the corner tank, multiple tank configurations, and a method of creating an optical illusion that a tank having a rectangular solid volume exists in the corner of a room.

Accordingly, an object of this invention is to create the appearance of a traditional rectangular solid aquarium with a tank occupying only one quarter of the space.

Another object is to provide a tank which efficiently and attractively fits into the corner of a room and eliminates the distortion associated with viewing through a corner of a tank without sacrificing either the image quality or the appearance of volume provided by a traditional aquarium.

Still another object is to provide a space saving tank which produces an optical illusion multiplying the volume and contents of the tank fourfold.

Yet another object of the invention is to provide a tank which operates equally well as an aquarium or terrarium and produces multiple, coherent, high quality images of the contents of the tank.

A further object is to provide a tank system including a tank, a support structure and a hood which are all especially designed to efficiently and attractively utilize corner space.

A still further object is to provide such a corner tank which can be used either alone or in multiples to produce aesthetically pleasing optical effects and which can be manufactured easily, efficiently, expeditiously and inexpensively using known manufacturing techniques.

BRIEF DESCRIPTION OF THE DRAWINGS

These and other objects, advantages and features of the present invention will become more readily apparent from the following detailed description read in conjunction with the accompanying drawings wherein:

FIG. 2 is an elevational view of the right side of the tank system;

FIG. 3 is an elevational view of the left side of the tank system;

FIG. 4 is a diagram illustrating the volume multiplying effect of the present invention;

FIG. 5 is an exploded view of the tank of the present invention;

FIG. 6 is a sectional view taken along lines 6—6 of FIG. 1;

FIG. 7 is a top view of a hood useful in the present invention;

DETAILED DESCRIPTION

Figure 1:
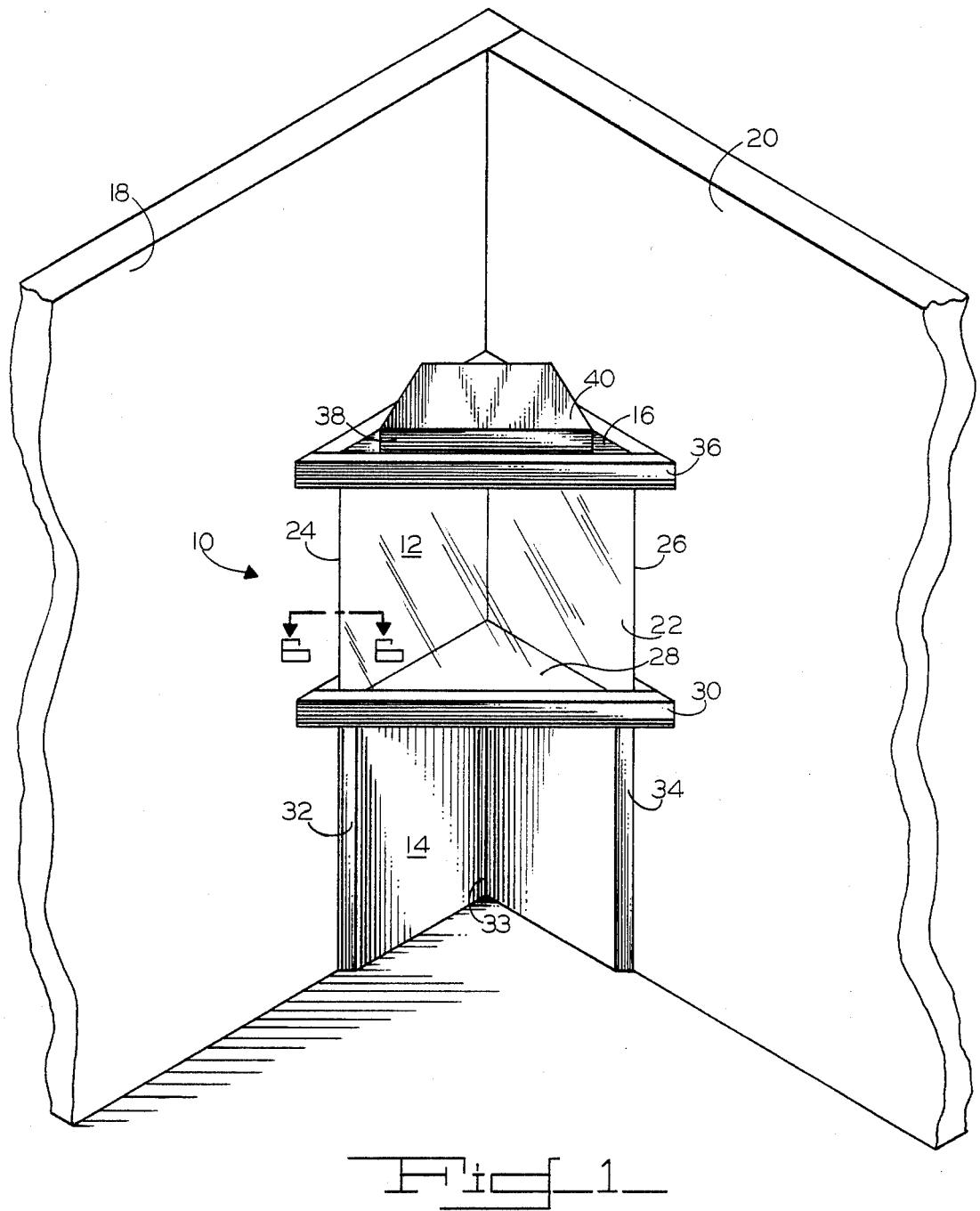
FIG. 1 is an isometric view of the corner tank system of the present invention.

Referring to FIG. 1, a tank system 10 constructed according to the principles of the present invention is illustrated. The tank system includes tank 12, supporting structure 14 and a hood 16, all especially designed to efficiently and attractively fit in a corner of a room formed by abutting walls 18 and 20.

Although the tank will be described in terms of its application as an aquarium, it should be recognized that it is also useful as a terrarium or other display case for animate as well as inanimate objects. As illustrated in the front view of FIG. 1 and side views of FIGS. 2 and 3, tank 12 is comprised of a vertical transparent front member 22, a vertically disposed left side member 24 and a vertically disposed right side member 26. Each of side members 24 and 26 has a reflective surface facing the interior of the tank. The side members meet at an angle equal to that formed between corner walls 18 and 20, generally 90°. Preferably tank 12 has a horizontal cross sectional profile in the shape of a right isoceles triangle. Located at the bottom of the tank is a bottom member 28 of triangular configuration matching that of the horizontal cross sectional profile of the tank. A more detailed description of the construction of the tank will be provided hereinafter in connection with FIGS. 5 and 6.

Located about the bottom periphery of tank 12 is optional bottom framing 30. This framing can be constructed according to techniques well known in the art to provide a recessed opening for accommodating the bottom of tank 12 therein. Framing 30 which can be made of wood, metal or other suitable material provides structural support to the tank and also adds to its aesthetic appearance.

Located below tank 12 is a support structure or stand 14 for maintaining the tank at a desired elevation. As illustrated in FIG. 1, stand 14 can include a left side supporting member 32 disposed generally parallel to left side member 24 of aquarium 12 and a right side supporting member 34 disposed generally parallel to right side member 26 of tank 12. Support members 32 and 34, like tank side members 24 and 26, converge in the corner and may be secured along common edge 33 by any suitable means. A reinforcing member (not shown) may extend between the top front corners of support members 32 and 34, just behind the front portion of bottom framing 30.

Configurations of stand 14 other than that illustrated in FIG. 1 are, of course, possible. The support structure may be mounted to walls 18 and 20 or free standing. The space under the tank may be open to view or enclosed. Shelves, drawers, etc. may be combined with the support structure. As a minimum, the support should possess sufficient structural strength to safely support a tank, hood, tank contents and any accessory equipment at the desired elevation. From an aesthetic standpoint, it is preferred that the support structure not protrude into the room substantially beyond front member 22.

Positioned atop tank 12 is a hood 16 of triangular configuration. Top framing 36, similar in purpose and construction to bottom framing 30, may optionally be employed, as part of hood 16 or independent thereof. Hood 16 acts as a protective cover and vapor barrier for tank 12. The hood generally includes a lid 38 preferably located near the front of the tank for providing ready access to its contents. A housing 40 for supporting tank illumination means, such as a light bulb, may be located near the center of hood 16. The rearmost area of hood 16 is preferably employed as a utility space to locate and connect various accessory equipment employed with the tank. Further details of hood construction will be described hereinafter in conjunction with FIGS. 7, 8, 10 and 11.

When tank 12 is used as an aquarium, it will be filled with water, fish and possibly other animate and inanimate items to create a miniature replica of an underwater environment. Accessory equipment or utilities such as filters, heaters and the like will be placed in the tank to maintain the desired environment, all in a manner well known to those versed in this art. The contents of the tank and accessories employed could, of course, vary depending upon the desires of the user and the use to which the tank is put.

As most clearly illustrated in FIG. 1, the tank system of the present invention is especially designed and configured to efficiently and attractively fit in the corner of a room. With the tank's side walls substantially flush to the abutting walls of the corner and with its front member 22 enclosing the corner, the tank system provides a symmetrical appearance extremely pleasing to the eye. The tank's contents is visible through the single pane front member from everywhere in the room thus avoiding the distortion associated with viewing through tank corners. Moreover, as more fully described hereinafter, the tank of the present invention provides a surprising volume multiplying optical effect to an observer looking through the front member.

The startling optical effect produced by the tank of the present invention is diagrammatically illustrated in FIG. 4. Referring to this figure, A, C, c, a and B, C, c, b, respectively represent the mirrored sides of tank 12 which are substantially flush to the corner walls. A, B, b, a represents the transparent front member of tank 12. Due to its special construction, the corner tank of the present invention provides an observer looking through its front member with an illusion of substantially increased volume. To such an observer, the corner tank appears to have the same volume as the traditional rectangular solid aquarium. The apparent volume of the tank is defined by the points A, B, E, D and a, b, e, d in FIG. 4. The tank thus appears to have a depth equal to its width and provides a fourfold volume multiplying optical effect. Moreover, the sides A, D, d, a and B, E, e, b of the simulated rectangular solid tank appear to be reflective providing the same wraparound optical effect as the traditional aquarium. It will thus be apparent that the corner tank of the present invention though occupying only one quarter of the space and capable of fitting snugly into a room corner provides an optical effect comparable to the traditional rectangular aquarium.

FIG. 5 is an exploded view of the corner tank, useful in more fully understanding its construction. As shown, front member 22 preferably comprises a relatively thin, flat pane of glass or other transparent material, of rectangular configuration. Front member 22 has first and second vertical side edges 44 and 46, a bottom edge 48 and a top edge 50. Although preferably flat, front member 22 may be bowed or may otherwise deviate from a planar construction.

Left side member 24 preferably comprises a relatively thin, flat pane of glass of rectangular configuration with its back face coated with a reflective surface. Side member 24 may be constructed of other materials according to techniques well known in the art so long as it provides a reflective surface 52 facing the interior of the tank. Side member 24 has a first vertical side edge 54 located adjacent side edge 44 of front member 22, a second vertical side edge 56 located behind front member 22 and a bottom edge 58 and top edge 60.

Right side member 26 may be constructed in a manner identical to side member 24. This second side member has a reflective surface 62 facing the interior of the tank, a first vertical side edge 64 located adjacent side edge 56 of side member 24, a second vertical side edge 66 located adjacent side edge 46 of front member 22, a bottom edge 68 and a top edge 70.

Positioned at the bottom of tank 12 is a member 28 of generally triangular configuration. Base member 28 may comprise a pane of glass or other suitable material, configured to match the horizontal cross section of the tank with its three lateral edges 72, 74 and 76 positioned adjacent to and coextensive with the bottom edge 48 of front member 22, bottom edge 58 of side member 24 and bottom edge 68 of side member 26, respectively.

The various members of the tank may be secured to one another along adjoining edges by glue or other suitable means. When used as an aquarium, a watertight sealant, commercially available, is preferably employed. The edges of the members of the tank may be left square or beveled to meet and form the corners of the tank. One possible construction is shown in the sectional view of FIG. 6. As illustrated therein, vertical side edge 54 of side member 24 is ground to a substantially 45° angle and joined by a layer of glue/sealant 78 to the periphery of front member 22. A bead 80 of glue/sealant may be placed along the corner formed between side member 52 and front member 22 to reinforce the joint. Other techniques known in the aquarium manufacturing art, to join the tank members or reinforce such joints, may also be employed.

By way of further illustration, a tank actually constructed by the inventor according to the principles of the present invention employed ¼" thick panes of glass for the front and base members and ¼" thick silvered glass mirrors for the side members. The side members each measured 24" square and the front member was 34" wide and 24" high. The tank was sealed with a silicone sealant in the manner illustrated in FIG. 6 and functioned as a 29 gallon aquarium.

FIG. 7 is a plan view of the hood 16 shown in FIG. 1. The hood includes a lid 38 preferably disposed towards the front of the tank for permitting ready access to the tank's contents. Lid 38 may be hinged at 84 to rotate about an axis R located parallel to and rearwardly of the top edge of front member 22. The lid is configured so that it can rotate from its normally horizontal position to a vertical position without interference with the walls of a room corner. The central part of hood 16 contains a housing 40 for a source of tank illumination, such as light bulb 82. At the rear of the hood is preferably located the utility space 42 for accommodating tank accessories and connections, generally illustrated at 83.

The single, fixed bulb, hood of FIG. 7 is an easily constructed, low cost design which provides good access to the tank interior. However, light penetration to vertices A and B is diminished.

Figure 8:
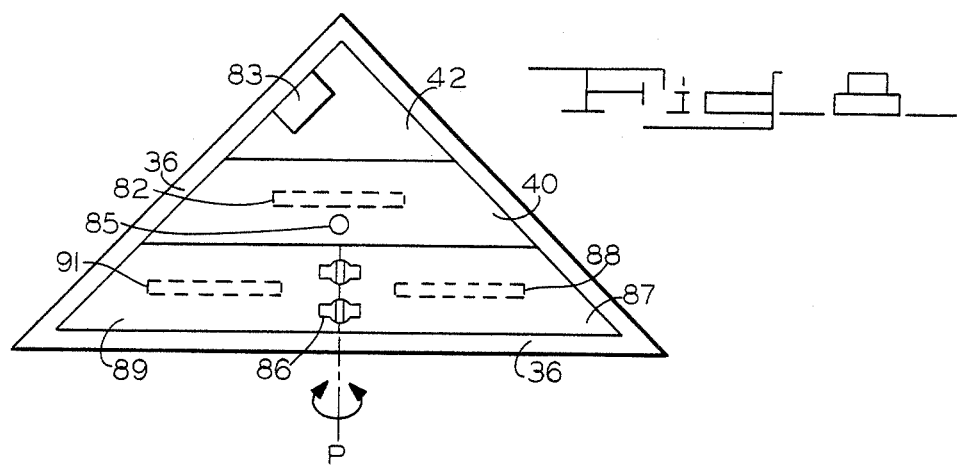
FIG. 8 is a top view of an alternate embodiment of a tank hood.

The alternative hood construction of FIG. 8 provides for full light penetration to the front corners of the tank. In this embodiment, the forward section of the hood is bisected along an axis P perpendicular to the top edge of front member 22. A right lid segment 87 with an incorporated light bulb 88 is hinged at 86 to left lid segment 89 which incorporates a light bulb 91. The lid segments can rotate about axis P without interference with the corner walls, to provide ready access to either side of the tank. A switch 85 may be employed to turn on and off bulbs 82, 88 and 91. Although this construction is more complex than that shown in FIG. 7, it provides excellent illumination to the interior of the tank.

Figure 10:
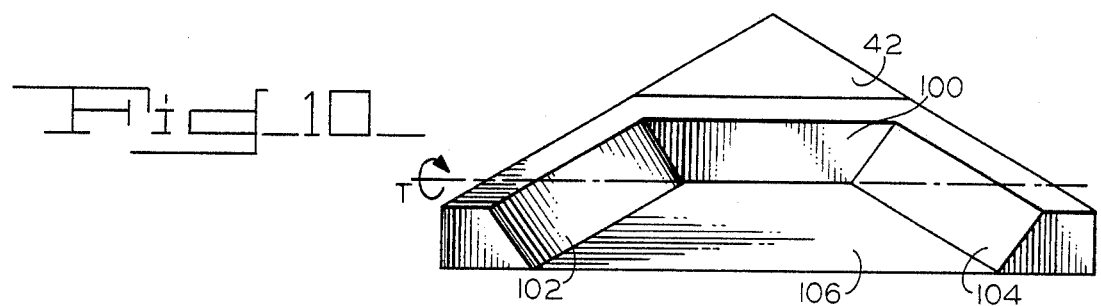
FIG. 10 is an isometric view of the presently preferred embodiment of a corner tank hood.

Yet another alternative construction of hood 16 is shown in FIG. 10. In this embodiment, in addition to a central light housing 100, light housings 102 and 104 disposed parallel and adjacent to the top edges of respective side members of the tank, are employed. The fixed light housings of this triple bulb construction surround a trapezoidally shaped lid 106 which is hinged to rotate about an axis T. In addition to providing good light penetration to all points of the tank particularly the acute corners, this construction, by placing the light sources near the mirrored sides produces complete illumination of all objects facing the mirrors.

Figure 11:
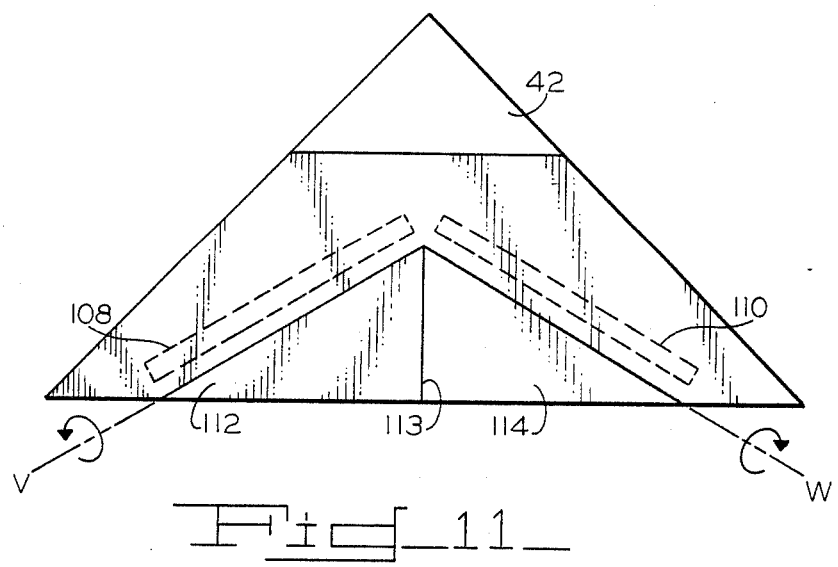
FIG. 11 is a top view of another alternate embodiment of a tank hood.

FIG. 11 illustrates another variation in hood design. In this embodiment, immobile light bulbs 108 and 110 extend from the respective front corners of the hood back generally towards utility area 42. A lid at the front of the hood is divided into two segments 112 and 114 along line 113. Lid segment 112 is hinged to rotate about axis V while lid segment 114 is rotatable about axis W. For clarity of illustration, the hinges and optional top framing are not shown in this figure.

It will be apparent that other alternative constructions of the corner tank hood are possible. In general these will involve consideration of the following major design criteria: SUFFICIENT UTILITY SPACE—the least obstructive location for this space is in the rear corner of the tank. This location is also best for the filter placement due to the waterflow characteristics of the tank. EASE OF ACCESS—ready access at or near the front of the tank with a lid which will not interfere with the corner walls is desirable. COMPLETE ILLUMINATION—this criteria has two aspects: Light penetration to all points of the tank particularly the acute corners and the avoidance of back lighting problems, i.e., shadows of objects on the side facing the mirror. Cost/complexity of construction and aesthetic appearance must also be taken into account. Variations in the number of bulbs employed, their mounting, e.g. fixed or lid mounted, the materials of construction, etc. are all within the contemplation of the present invention.

Figure 9:
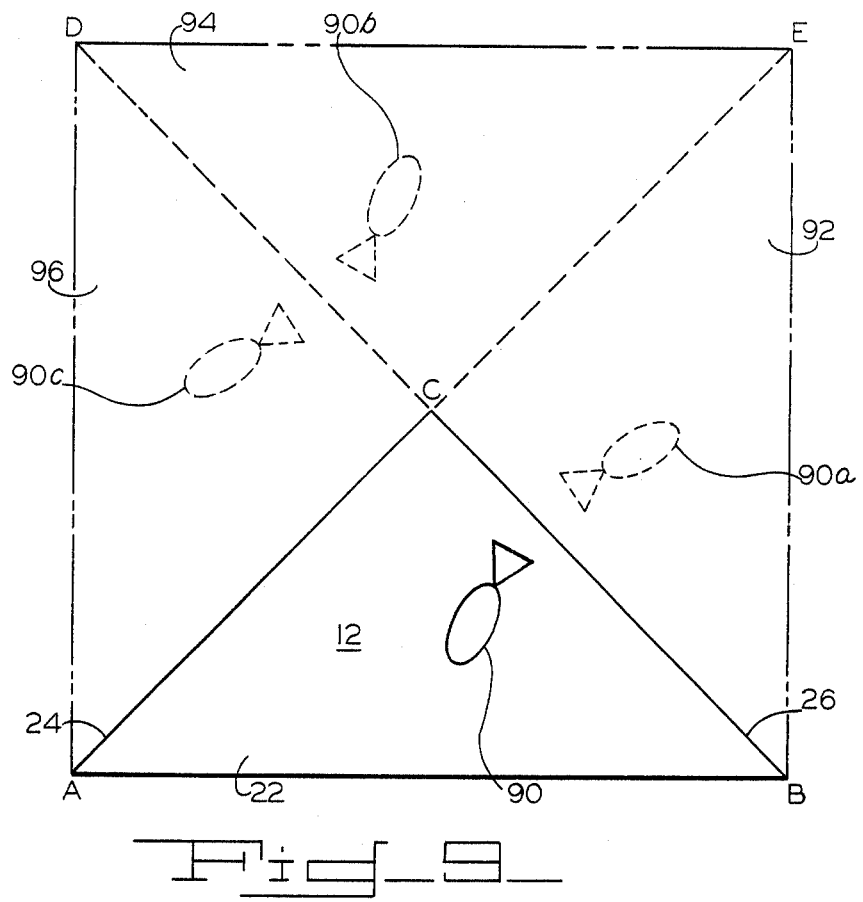
FIG. 9 is a diagram useful in understanding both the optical effects and multiple tank arrangements of the present invention.

FIG. 9 is a top view illustrating the volume and contents multiplying optical effect produced by the corner tank of the present invention. Although shown in plan view, in reality the apparent increased volume and multiple images can only be seen through front member 22 of tank 12. The reflective qualities of side members 24 and 26 and their spatial relationship produce the four-fold volume and image multiplying effect so that a fish 90 also appears as substantially distortion free images oriented and seemingly located as shown at 90a, 90b, and 90c. These images and the apparent boundary of the enhanced volume tank are shown in phantom in FIG. 9 to highlight their illusionary nature but to an observer these appear highly realistic.

The present invention also contemplates arranging two or more corner tanks with their side members adjacent each other to produce composite tanks having unique optical properties. For example, two identical corner tanks 92 and 94 can be positioned with a side member of each tank located along common line C–E of FIG. 9. Alternatively, four corner tanks, as illustrated in FIG. 9, can be positioned with their right angle vertices meeting at point C. This arrangement would occupy the same space as a tank of square cross section but would provide four completely different appearances when viewed through the different front members.

In summary, a tank constructed and employed according to the principles of the present invention will efficiently and attractively fit into awkward corner space and provide a surprising four-fold volume and distortionless image multiplying effect, thereby fulfilling the promise of this specification.

From the above illustrative description, other arrangements, modifications and applications of the present invention will be readily apparent. For example, the tank of the present invention is particularly well suited for providing the appearance of a traditional aquarium in situations where a tank of only limited depth can be employed. All such variations which fall within the scope of the appended claims are considered to be within the ambit of the present invention.

What I claim is:

1. A tank configured to match the contour of a corner of a room with its front member traverse to the walls of the corner, which provides the appearance of a ractangular solid tank of substantially greater volume when viewed through the front member comprising:

a vertical front member of transparent material for viewing therethrough, the vertical front member having first and second vertical side edges, a bottom edge and a top edge;

a first vertical side member having a reflective surface facing the interior of the tank, said first vertical side member having a first vertical edge located adjacent the first vertical edge of the front member, a second vertical edge located behind the front member, a top edge and a bottom edge;

a second vertical side member having a reflective surface facing the interior of the tank, the second vertical side member having a first vertical edge located adjacent the second vertical edge of the front member, a second vertical edge adjacent the second vertical edge of the first side member, a top edge and a bottom edge; and said second side member being substantially perpendicular to said first side member, and said tank having a horizontal cross-sectional profile in the shape of a right isoceles triangle, whereby the tank, when placed in the corner of a room with the first side member parallel and adjacent to a first wall of the room corner and the second side member parallel and adjacent to a second wall of the room corner, provides an appearance to an observer looking through the front member of a rectangular solid tank of constant depth and of substantially greater volume, with the increased volume appearing to extend into said first and second walls.

2. The tank of claim 1 including means for providing substantially distortion-free multiple images of items within the tank to an observer looking through the front member.

3. The tank of claim 1 further comprising means for supporting the tank in the corner of the room, said supporting means being constructed so as not to protrude into the room substantially beyond the front member.

4. The tank of claim 3 wherein the tank is supported by said supporting means such that each side member of the tank is substantially flush with respect to the adjacent wall of the room corner, whereby the contents of the tank can be viewed from substantially throughout the room without encountering the distortion associated with viewing through a tank corner.

5. The tank of claim 1 further including a base member of triangular configuration having three lateral edges, each of said lateral edges being substantially coextensive with and located adjacent to a different one of the bottom edges of said front member, said first side member and said second side member.

6. The tank of claim 5 further including a hood located at the top of the tank and resting on the top edges of the front member and first and second side members, said hood having a right isoceles triangle configuration and having a first section for providing a utility opening, said first section being located near the rear of the hood, a second section for supporting a source of tank illumination, said second section being located near the center of the hood, and a third section including a lid for providing access to the interior of the tank, the third section being located near the front of the hood, and wherein the lid is configured and mounted to open without interference with the walls of the corner.

7. The tank of claim 6 further including means for providing substantially complete illumination of the inerior of the tank.

8. The tank of claim 6 further including means for supporting a first source of illumination and a second source of illumination, such that said first source extends, from near a first front corner of the hood towards the first section and said second source of illumination extends from near a second front corner of the hood towards the first section of the hood and wherein the lid is divided into two segments, each lid segment being rotatable about an axis extending from the front of the hood generally rearward.

9. The tank of claim 6 wherein the lid is hinged along a line parallel to the top edge of the front member and spaced rearwardly thereof, and the lid is configured so that it can be rotated to a substantially vertical position without being obstructed by the walls of the corner.

10. The tank of claim 9 further including means for supporting at least one source of tank illumination in a position substantially parallel and adjacent to a top edge of a side member.

11. The tank of claim 6 wherein the lid is hinged along an axis perpendicular to the top edge of the front member.

12. The tank of claim 11 wherein the hinge axis intersects the top edge of the front member substantially at the center thereof.

13. The tank of claim 12 wherein the lid comprises two segments, the segments being located on opposite sides of the hinge axis, each segment being rotatable about the hinge axis.

14. The tank of claim 13 wherein each lid segment further includes means for supporting tank illumination means.

15. A method of creating the optical illusion that a tank having a rectangular solid volume exists in the corner of a room comprising the steps of:
   providing a tank of triangular cross section having a front transparent panel and two side panels, the side panels converging to form an angle therebetween substantially equal to the angle formed by abutting walls of the room corner;
   providing a reflective surface facing the interior of the tank on each of the side panels;
   locating the tank in said corner such that each of the side panels is substantially flush with respect to a different one of the abutting walls of the room corner, whereby an observer looking through the front panel is provided with an image that appears to be created by a tank of rectangular solid volume.

16. A tank which provides a four-fold volume multiplying optical effect comprising:
   a front vertical member of transparent material;
   a pair of vertical flat side members, each side member having a reflective surface;
   said front member and two side members being arranged in the configuration of a right isoceles triangle with an angle between the reflective surfaces of the side members of 90°, whereby the tank appears to an observer looking through the front member to be a rectangular solid of constant depth substantially equal to the width of the front member.

17. The tank of claim 16 in combination with at least one other tank similarly constructed, the tanks being positioned so that at least one side member of each tank is adjacent a side member of another tank.

18. A hood specially constructed to overly the top of a corner tank, the corner tank being designed to fit in a corner of a room with two abutting light reflective side members of the tank positioned parallel to respective walls of the corner and a front member of the tank positioned transverse to the walls of the corner, said hood having a horizontal sectional configuration in the shape of a right isoceles triangle, said hood having a first section for providing a utility opening, said first section being located near the rear of the hood, a second section for supporting a source of tank illumination, said second section being located near the center of the hood, and a third section including a lid for providing access to the interior of the tank, said third section being located near the front of the hood, and wherein said lid is configured and mounted to open and provide access to the interior of the tank, when the tank is located in a corner of a room, without interference with the walls of the room corner.

19. The hood of claim 18 wherein the lid is hinged to rotate about a horizontal axis and wherein the lid is configured to rotate to a substantially vertical position without being obstructed by the walls of the corner.

20. The hood of claim 19 wherein the horizontal axis is parallel to a top edge of the front member of the tank and spaced rearwardly therefrom, and further incuding first means for supporting tank illumination means in a position which is both substantially parallel to said horizontal axis and spaced rearwardly of said axis.

21. The hood of claim 20 further including means for supporting additional tank illumination means in positions adjacent to and substantially parallel to top edges of said tank side members.

22. The hood of claim 19 further including means for providing substantially complete illumination of the interior of the thank and of all sides of objects in the tank.

23. The hood of claim 19 wherein the lid is divided into two segments along a line perpendicular to and bisecting a top edge of the front member.

24. The hood of claim 23 wherein each lid segment is hinged to rotate about said line and each lid segment includes means for supporting tank illumination means.

25. The hood of claim 23 wherein each lid segment has the shape of a right triangle and is rotatable about a hypotenuse of said triangle, and wherein the second section of said hood includes means for supporting a first source of illumination and a second source of illumination, such that the first source extends from near a first front corner of the hood towards the first section of the hood and said second source of illumination extends from near a second front corner of the hood towards the first section of the hood.

* * * * *